Dec. 17, 1946.  I. WOLFF  2,412,703
RADIO LOCATOR DEVICE
Filed Aug. 29, 1941  2 Sheets—Sheet 1

Fig. 1.

Fig. 3.

- INITIAL PULSE
- HIGH AND ON PATH
- RIGHT OF PATH AND SAME LEVEL
- HIGH AND TO THE RIGHT
- STRAIGHT AHEAD

DISTANCE

Fig. 4.

UPPER RIGHT  UPPER LEFT
ZONE OF RADIATION  DIRECTION
LOWER RIGHT  LOWER LEFT

Inventor
Irving Wolff
By J. J. Huff
Attorney

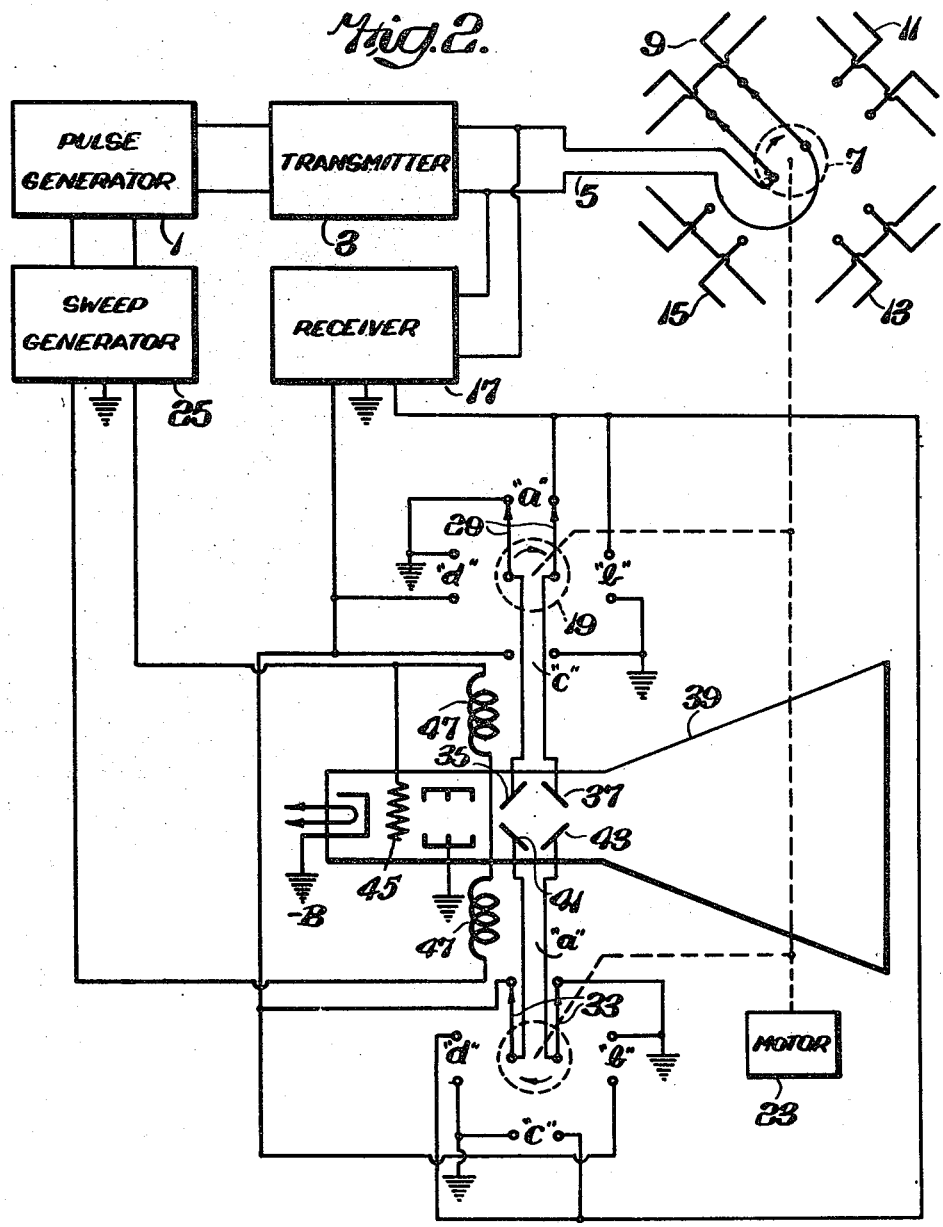

Patented Dec. 17, 1946

2,412,703

UNITED STATES PATENT OFFICE 2,412,703

RADIO LOCATOR DEVICE

Irving Wolff, Merchantville, N. J., assignor to Radio Corporation of America, a corporation of Delaware Application August 29, 1941, Serial No. 408,849

13 Claims. (Cl. 250—1.62)

This invention relates to improvements in radio locator devices and particularly to a radio locator device in which beams of pulse energy are successively radiated in predetermined zones and in which the echo signals from an object within said zones are applied to a cathode ray tube for indicating the distance and zone location of the object. Furthermore, the instant invention relates to an improvement in the indicating device disclosed in my copending application Serial No. 259,057, filed February 28, 1939, for "Object detection and location."

In the copending application a radio locator of the pulse-echo type is described. The pulse energy is successively applied to four directive antennas from which the pulse energy is radiated through four distinctive and predetermined zones. An object within the zones or any one of them will reflect the pulses. The received pulses are applied to a cathode ray indicator. The indicator is provided with a sweep circuit which sweeps the ray along a calibrated distance scale. The deflecting electrodes of the cathode ray tube are connected to the receiver through appropriate switching and filter means so that additional and distinctive deflections of the cathode ray indicate the location of the object as a function of distance and with respect to one or more of the predetermined zones of radiation.

In practice the distinctive deflections are obtained by deflecting the ray at an angle with respect to the sweep. The apparatus disclosed in the said copending application for obtaining the angular deflections may be greatly simplified according to an improved embodiment of the instant invention and may be improved according to another embodiment of the invention. One of the objects of the invention is to provide improved means for deflecting a cathode ray along three coordinates. Another object is to provide improved means for indicating the distance and location of a radio pulse reflecting object. Another object is to provide an improved and simplified cathode ray sweep for a radio locator whereby distinctive traces are obtained to indicate the distance and reference zone of a detected object and to provide an illusion of distance.

The invention will be described by referring to the accompanying drawings in which Figure 1 is a schematic diagram of one embodiment of the invention; Figure 2 is a schematic diagram of the preferred embodiment of the invention; and Figures 3 and 4 are illustrations used in describing the invention. Similar reference characters indicate similar elements in the drawings.

Referring to Fig. 1, a pulse generator 1 is connected to the transmitter 3 which is in turn connected by a transmission line 5 to a rotary four-position switch 7. The switch is arranged to connect the transmitter successively to four directive antennas 9, 11, 13, 15. The antennas may be provided with reflectors to obtain the desired degree of directivity in predetermined zones. The several antennas are also connected through the transmission line 5 to a receiver 17. The output of the receiver is preferably balanced and is applied to a pair of rotary four-position switches 19 and 21, respectively, which are operated in synchronism with the antenna switch 7 by a motor 23. In practice, the several switches 7, 19, 21 may be connected on a common shaft coupled to the motor.

A sweep circuit generator 25 is connected through filters 27 to the two movable contacts 29 of the upper switch 19 and through similar filters 31 to the two movable contacts 33 of the lower switch 21. The movable contacts 29 may be connected through resistors (not shown) to the upper deflecting electrodes 35, 37 of a cathode ray tube 39. The movable contacts 33 may be connected through resistors (not shown) to the lower deflecting electrodes 41, 43 of the cathode ray tube. The deflecting electrodes form the sides of a quadrilateral figure. The output of the receivers 17 is preferably balanced and is connected to the fixed contacts of the switches 19 and 33 so that the output potential from the receiver 17 is applied to the deflecting electrodes as follows: In the first switch position $a$ to electrodes 37 and 41; in the second switch position $b$ to electrodes 35 and 43; in the third switch position $c$ to electrodes 41 and 37 but reversed in polarity from switch position $a$; and in the fourth switch position $d$ to electrodes 41 and 35 but reversed in polarity from switch position $b$.

The operation of the device is essentially as follows: The pulses from the generator 1 key the transmitter 3, which applies pulses of radio frequency energy to the antennas 9, 11, 13 and 15 in succession. From each antenna the pulses are radiated directively in predetermined zones or regions. For example, the regions may be arranged with respect to a reference direction line as shown in Fig. 3. The sweep generator voltage is synchronized with each outgoing pulse, and is applied to the pairs of deflecting electrodes (35, 37 and 41, 43, respectively) so that a conventional trace is formed by deflecting vertically the cathode ray along the diagonal formed by the pairs of electrodes. The filters 27 and 31 are designed to pass the deflecting currents and to reject the echo signal currents. Since the signal currents are applied to the diagonally arranged deflecting electrodes in pairs (for example 37 and 41) it follows that the signal currents will deflect the ray along an angle and if properly polarized the angle will be upperward and to the right for the corresponding zone of radiation. As the synchronized switch is operated the angular deflections will correspond to the several zones of radiation. For example, switch position *a* may correspond to upper right; *b* to lower right; *c* to lower left; and *d* to upper left. By connecting the control electrode 45 to the sweep generator, the brightness of the trace may be varied as a function of distance so that more remote reflections appear as weaker signals to give the illusion of distance.

The above described arrangement may be further simplified by applying the vertical deflecting voltages to a pair of magnetic deflecting coils 47 as shown in Fig. 2. This connection is preferable because it makes it possible to omit the filters 27, 31 of Fig. 1. The balance of Fig. 2 corresponds to Fig. 1, and the operation of Fig. 2 being substantially the same as that of Fig. 1, the description thereof will not be repeated. The indications obtained in either circuit arrangement are the same for the same object location and distance. Fig. 4 is a graph illustrating the nature of the indications by appropriate legends. The distance illusion is indicated by making the lines heaviest for the reflections from the nearest object and lightest for the reflections from the most remote objects. It should be understood that the brightness control may be made fixed instead of variable, if the user prefers to eliminate the "distance illusion" by connecting the electrode to a source of fixed bias potential.

Thus the invention has been described as a radio locator in which the signals corresponding to the energy from a reflecting object are applied to an improved cathode ray indicator. The indicator includes deflecting elements which are located at the sides of a square. The ray is deflected along a distance coordinate substantially corresponding to a diagonal of the square. The ray is further deflected at an angle to the distance coordinate by applying the echo signals in appropriate polarity to pairs of the deflecting elements. The switch which applies the echo signals from the receiver to the deflecting elements is operated in synchronism with switching means which applies the pulses to the differently directed antennas. Since the angular deflections, corresponding to the received echo signals, each correspond to the predetermined zones, it is possible to identify the zone or zones including the reflecting object. It is also possible to observe the distance of the body as a function of the distance scale. A distance or perspective illusion may be created by varying the intensity of the cathode ray as a function of distance.

I claim as my invention:

1. A radio locator including means for establishing pulses of radio frequency energy, means for radiating said energy distinctively in adjacent and different zones, means for receiving said energy after reflection from an object within said zones, a cathode ray tube including four symmetrically arranged deflecting elements, means for sweeping said ray in synchronism with said pulse radiation along a distance coordinate coinciding substantially with a diagonal of said symmetrically arranged elements, and means for connecting said deflecting elements to said receiving means to deflect said ray at angles to said diagonal sweep corresponding successively to said zones.

2. A radio locator including means for establishing pulses of radio frequency energy, means for radiating said energy distinctively in zones of predetermined directivity, means for receiving said energy after reflection from an object within said zones, a cathode ray tube including four deflecting elements respectively located at the sides of a rectangle, means for sweeping said ray in synchronism with said pulse radiation along a distance coordinate coinciding substantially with one of the diagonals of said rectangle, and means for connecting said deflecting elements to said receiving means to deflect said ray at angles to said diagonal sweep corresponding successively to said zones.

3. A radio locator including means for establishing pulses of radio frequency energy, means for radiating said energy distinctively in adjacent and different zones, means for receiving said energy after reflection from an object within said zones, a cathode ray tube including four symmetrically arranged deflecting elements, means including said deflecting elements for sweeping said ray in synchronism with said pulse radiation along a distance coordinate coinciding substantially with a diagonal of said symmetrically arranged elements, and means for connecting said deflecting elements to said receiving means to deflect said ray at angles to said diagonal sweep corresponding successively to said zones.

4. A radio locator including means for establishing pulses of radio frequency energy, means for radiating said energy distinctively in zones, means for receiving said energy after reflection from an object within said zones, a cathode ray tube including four symmetrically arranged deflecting elements, additional means for sweeping said ray in synchronism with said pulse rediation along a distance coordinate coinciding substantially with a diagonal of said symmetrically arranged elements, and means for connecting said deflecting elements to said receiving means to deflect said ray at angles to said diagonal sweep corresponding successively to said zones.

5. A radio locator including means for establishing pulses of radio frequency energy, means for radiating said energy distinctively in zones, means for receiving said energy after reflection from an object within said zones, a cathode ray tube including four symmetrically arranged deflecting elements, magnetic deflecting means for sweeping said ray in synchronism with said pulse radiation along a distance coordinate coinciding substantially with a diagonal of said symmetrically arranged elements, and means for connecting said deflecting elements to said receiving means to deflect said ray at angles to said diagonal sweep corresponding successively to said zones.

6. A radio locator including means for establishing pulses of radio frequency energy, means for radiating said energy successively in zones of predetermined directivity, means for receiving said energy after reflection from an object within said zones, a cathode ray tube including four deflecting elements respectively located at the sides of a quadrilateral figure, means for sweeping said ray in synchronism with said pulse radiation along a distance coordinate coinciding substantially with one of the diagonals of said quadrilateral figure, and means for connecting said deflecting elements to said receiving means in synchronism with the radiation of said pulses in said zones to deflect said ray at angles to said diagonal sweep corresponding successively to said zones.

7. A radio locator including means for establishing pulses of radio frequency energy, means for radiating said energy in zones of predetermined directivity, means for receiving said energy after reflection from an object within said zones, a cathode ray tube including four deflecting elements respectively located at the sides of a rectangle, means for sweeping said ray in synchronism with said pulse radiation along a distance coordinate coinciding substantially with one of the diagonals of said rectangle, means for connecting said deflecting elements to said receiving means to deflect said ray at angles to said diagonal sweep corresponding successively to said zones, and means for applying potentials varying with said diagonal sweep for varying the intensity of said cathode ray.

8. A radio locator including means for establishing pulses of radio frequency energy, means for radiating said energy in different zones, means for receiving said energy after reflection from an object within said zones, a cathode ray tube including four symmetrically arranged deflecting electrodes, means for sweeping said ray along a distance coordinate coinciding with a diagonal of said symmetrically arranged electrodes in synchronism with said pulse radiation, means for connecting said cathode ray tube to said receiver to deflect said ray at angles to said diagonal sweep corresponding successively to said zones, and means connected to said cathode ray tube to regulate the brightness of the ray as a function of said distance coordinate.

9. A cathode ray indicator including, in combination, a cathode ray tube having four deflecting elements arranged to form the sides of a quadrilateral figure, means for sweeping said ray along one diagonal of said figure, and means for successively deflecting said ray toward the sides of said figure so that indications may be obtained along three coordinates.

10. A cathode ray indicator including, in combination, a cathode ray tube having four deflecting elements arranged substantially parallel to the sides of a quadrilateral figure, additional elements for sweeping said ray along one diagonal of said figure, and means including said elements for successively deflecting said ray toward the sides of said figure so that indications may be obtained along three coordinates.

11. A cathode ray indicator including, in combination, a cathode ray tube having four deflecting elements arranged to form the sides of a quadrilateral figure, magnetic means for sweeping said ray along one diagonal of said figure, and means including said elements for successively deflecting said ray toward the sides of said figure to obtain indications along three coordinates.

12. An indicator according to claim 9 including means for varying the intensity of said cathode ray as a function of one of said coordinates.

13. An indicator according to claim 10 including means for varying the intensity of said cathode ray as a function of one of said coordinates.

IRVING WOLFF.